United States Patent
Lacan et al.

(10) Patent No.: US 8,677,033 B2
(45) Date of Patent: Mar. 18, 2014

(54) METHOD FOR INITIALIZING REGISTERS OF PERIPHERALS IN A MICROCONTROLLER

(75) Inventors: Jerome Lacan, Trets (FR); Sandrine Lendre, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 13/541,283

(22) Filed: Jul. 3, 2012

(65) Prior Publication Data
US 2013/0013820 A1    Jan. 10, 2013

(30) Foreign Application Priority Data
Jul. 4, 2011   (FR) ...................... 11 56018

(51) Int. Cl.
*G06F 13/14*   (2006.01)

(52) U.S. Cl.
USPC ............................... 710/34; 710/10

(58) Field of Classification Search
None
See application file for complete search history.

(56) References Cited

U.S. PATENT DOCUMENTS

| | | | |
|---|---|---|---|
| 5,230,058 A | 7/1993 | Kumar et al. | |
| 5,884,094 A * | 3/1999 | Begun et al. | 710/10 |
| 5,911,084 A * | 6/1999 | Jones et al. | 710/62 |
| 6,119,192 A * | 9/2000 | Kao et al. | 710/311 |
| 6,195,749 B1 * | 2/2001 | Gulick | 713/1 |
| 6,272,584 B1 * | 8/2001 | Stancil | 710/241 |
| 7,631,153 B2 | 12/2009 | Mahrla et al. | |
| 8,130,596 B2 * | 3/2012 | Godat | 368/156 |
| 2006/0090017 A1 * | 4/2006 | Kim et al. | 710/22 |
| 2008/0148083 A1 | 6/2008 | Pesavento et al. | |

OTHER PUBLICATIONS

French Search Report for Corresponding French Application No. FR1156018, dated Jan. 23, 2012, 9 pages.
Martin, T., "The Insider's Guide to the STM32 ARM® Based Microcontroller," An Engineer's Introduction to the STM32 Series, Version 1.8, www.hitex.com, XP55017059, pp. 1-103, 2009.

* cited by examiner

*Primary Examiner* — Cheng-Yuan Tseng
(74) *Attorney, Agent, or Firm* — Seed IP Law Group PLLC

(57) ABSTRACT

Embodiments described in the present disclosure relate to a method for initializing registers of peripherals of a microcontroller, including acts of: accessing initialization data in a non-volatile memory connected by a main bus to a processing unit of the microcontroller and to the peripherals, activating a peripheral including registers to be initialized, and transferring the data read into the registers of the activated peripheral, the initialization data being accessed in the memory by an initialization circuit distinct from the processing unit, the initialization data accessed being sent to the peripherals by an initialization bus distinct from the main bus.

19 Claims, 4 Drawing Sheets

| | NVM | | | |
|---|---|---|---|---|
| D1 | PH1-W1 | PH1-W2 | PH1-W3 | PH1-W4 |
| D2 | PH1-W5 | PH1-W6 | PH1-W7 | PH3-W1 |
| D3 | PH3-W2 | PH3-W3 | PH4-W1 | PH4-W2 |
| D4 | PH4-W3 | PH4-W4 | | |
| WSEL | 0 | 1 | 2 | 3 |

METHOD FOR INITIALIZING REGISTERS OF PERIPHERALS IN A MICROCONTROLLER

BACKGROUND

1. Technical Field

The present disclosure relates to microcontrollers and in particular microcontrollers including peripherals.

2. Description of the Related Art

Microcontrollers generally include a central unit, memories including a volatile memory and a non-volatile memory, and several peripherals such as external bus controllers, timers, analog-digital converters, digital-analog converters, etc.

Certain microcontrollers have an idle mode during which some of their circuits and particularly all or part of their peripherals are switched off for energy-saving purposes. Generally, the idle mode is left when an external event occurs, and such an exit should be as swift as possible, particularly to react within an acceptable response time to the external event.

In general, microcontrollers execute an initialization procedure when switching on the microcontroller and when leaving the idle mode. This initialization procedure particularly enables state registers and registers for accessing the peripherals to be put into a predefined state. This initialization procedure is generally defined in the form of a sequence of instructions stored in a non-volatile program memory of the microcontroller and is executed by the central unit of the microcontroller. The initialization instruction sequence generally includes for each register to be initialized, an instruction for reading an initialization value in the non-volatile memory and an instruction for writing the read value in the register. This initialization sequence can also be performed by a DMA (Direct Memory Access) transfer unit previously programmed by the central unit of the microcontroller.

The result is that the initialization of the microcontroller is relatively costly in terms of execution time, power consumption and space in the non-volatile memory. The relatively significant time taken to execute this initialization procedure thus limits the use of idle mode and the energy savings likely to be made.

It is thus desirable to provide a means to enable registers of peripherals to be initialized without penalizing the activation time of the microcontroller after switching on the microcontroller or leaving an idle mode.

BRIEF SUMMARY

Some embodiments relate to a method for initializing registers of peripherals in a microcontroller, including acts of: accessing initialization data in a non-volatile memory connected by a main bus to a processing unit of the microcontroller and to the peripherals, activating a peripheral having registers to be initialized, and transferring the data read into the registers of the activated peripheral. According to one embodiment, the initialization data is accessed in the memory by an initialization circuit distinct from the processing unit, the initialization data accessed being sent to the peripherals by an initialization bus distinct from the main bus.

According to one embodiment, access to the non-volatile memory by the main bus has priority over access by the initialization bus, and access to the registers of peripherals by the initialization bus has priority over access requested by the main bus.

According to one embodiment, the method includes an act of selecting several registers of the activated peripheral, of sending several register initialization words for initializing a register of a peripheral simultaneously (e.g. concurrently) by the initialization bus, and of loading the initialization words sent into the selected registers of the activated peripheral.

According to one embodiment, several peripherals are activated simultaneously to each receive simultaneously at least one register initialization word.

According to one embodiment, several register initialization words for initializing several registers of a peripheral are sent simultaneously by the initialization bus and loaded into selected registers of the peripheral in one cycle of the clock signal of the microcontroller.

According to one embodiment, the initialization circuit transfers requests for accessing the memory sent by the main bus and transfers the data read in the memory to the main bus, in response to the access requests.

Some embodiments also relate to a microcontroller including a processing unit, peripherals having registers to be initialized, and a main bus linking the processing unit to the peripherals and to a non-volatile memory. According to one embodiment, the microcontroller includes an initialization circuit for initializing registers of peripherals, the initialization circuit linking the main bus to the memory and being linked to the peripherals by an initialization bus, the initialization circuit being configured to implement the method defined above.

According to one embodiment, the initialization bus has a width corresponding to several register initialization words for initializing a register of a peripheral.

According to one embodiment, the initialization circuit is linked to each peripheral by an activation link for activating the peripheral so as to initialize the registers of the peripheral, and a data link for sending a selection signal for selecting a peripheral register initialization word in a datum sent by the initialization bus.

According to one embodiment, the initialization circuit is linked to each peripheral by several activation links for activating the peripheral so as to initialize the registers of the peripheral, each activation link being associated with a data link for sending a selection signal for selecting a peripheral register initialization word in a datum sent by the initialization bus.

According to one embodiment, each peripheral includes an interface circuit configured to select a register and a register initialization word in a datum sent by the initialization bus and to load the word selected into the selected register.

According to one embodiment, the initialization circuit includes circuits for storing a storage base address in the memory containing initialization data for initializing the registers of a peripheral, and for each peripheral, a number of registers to be initialized, and indicators indicating whether or not the peripheral should be initialized and whether or not the peripheral has been initialized.

According to one embodiment, each peripheral includes an interface circuit connected to the main bus and to the initialization bus and configured to give priority to the access requests received by the initialization bus over those received by the main bus.

BRIEF DESCRIPTION OF THE SEVERAL VIEWS OF THE DRAWINGS

Some examples of embodiments described in the present disclosure will be described below in relation with, but not limited to, the following figures.

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings. One or more embodiments are described hereinafter with reference to the accompanying drawings in which.

DETAILED DESCRIPTION

Figure 1:
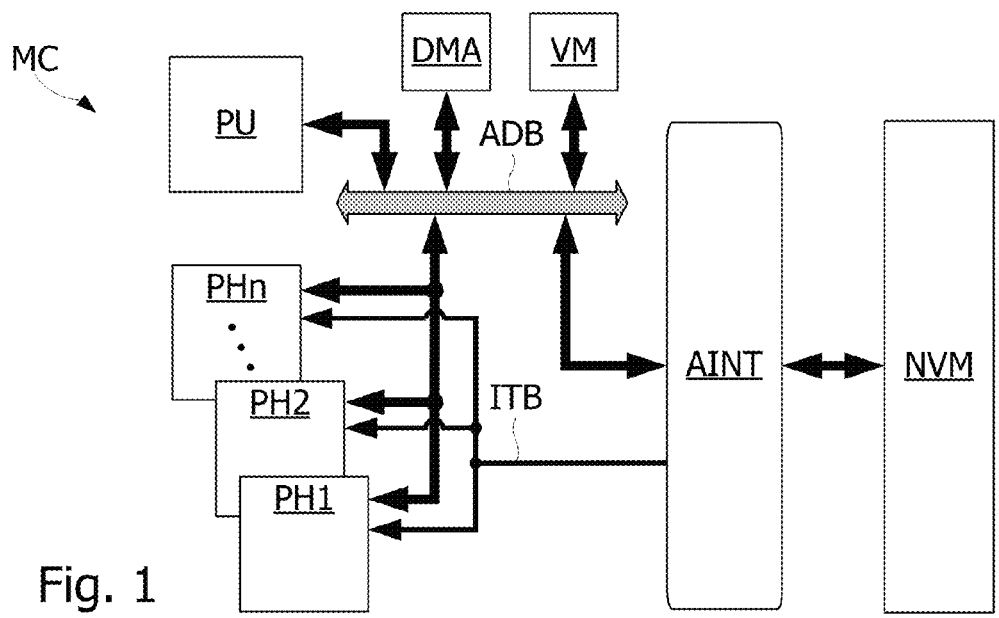
FIG. 1 schematically represents a microcontroller including a register initialization circuit for initializing registers of peripherals, according to one embodiment, FIG. 2 schematically represents the microcontroller and in particular the initialization circuit according to one embodiment.

FIG. 1 represents a microcontroller MC according to one embodiment. The microcontroller includes a processing unit PU and possibly a DMA (Direct Memory Access) transfer unit, a volatile memory VM, a non-volatile memory NVM, and peripherals PH1, PH2, . . . PHn. The unit PU, the DMA unit and the peripherals PH1-PHn are linked to a main address and data bus ADB of the microcontroller MC. The peripherals PH1-PHn may include one or more external bus controllers, one or more timers, one or more analog-digital converters, one or more digital-analog converters, etc. The memory VM is for example of RAM or SRAM type and the memory NVM can be for example of Flash or EEPROM type.

According to one embodiment, the memory NVM is linked to the bus ADB through an initialization circuit AINT that is also linked to the peripherals by an initialization bus ITB, to initialize registers of the peripherals PH1-PHn. Therefore, the peripherals PH1-PHn are connected both to the bus ADB and to the bus ITB. The circuit AINT is configured to read, in the memory, data for initializing registers of the peripherals PH1-PHn and to send the data read to the peripherals PH1-PHn concerned during an initialization phase of the microcontroller MC.

Figure 2:
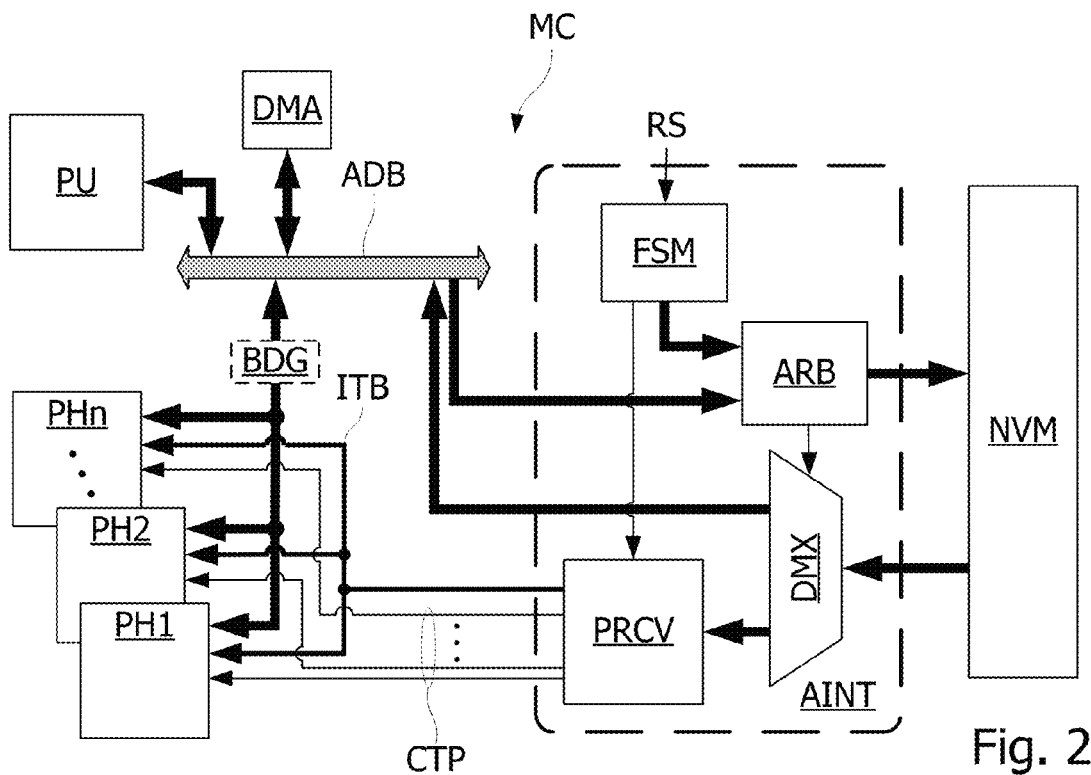

FIG. 2 represents the microcontroller MC and in particular, the circuit AINT according to one embodiment. The circuit AINT is linked to each peripheral PH1-PHn through the bus ITB and control links CTP. The circuit AINT includes a control circuit FSM, an arbitration circuit ARB controlled by the circuit FSM, a demultiplexer DMX controlled by the circuit ARB and a protocol conversion circuit PRCV connected to the bus ITB and to the control links CTP. The circuit ARB is connected at input to the bus ADB and at output to an addressing input of the memory NVM. The demultiplexer DMX is connected at input to a data output of the memory NVM and includes an output connected to the bus ADB and an output connected to the circuit PRCV. The circuit FSM includes for example a state machine that is initialized and activated upon receiving an initialization signal RS. The circuit FSM is configured to send read commands for reading in the memory NVM initialization data for initializing the registers of the peripherals PH1, PHn, and to supply the circuit PRCV, for each datum addressed in the memory NVM, with signals indicating the register(s) of peripherals PH1-PHn, receiving the datum. The circuit ARB is configured to retransmit to the memory NVM read commands from either the bus ADB, coming from the unit PU or DMA, or from the circuit FSM, giving priority to the read commands sent by the bus ADB. The demultiplexer DMX is controlled by the circuit ARB to send the data read in the memory NVM either to the bus ADB when the data corresponds to a read command received from the bus ADB, or to the circuit PRCV when the memory NVM was addressed by the circuit FSM to read data for initializing registers of the peripherals PH1-PHn. The circuit PRCV is configured to activate peripherals PH1-PHn according to the register initialization data received from the memory NVM and sent by the demultiplexer DMX, and to supply the activated peripherals PH1-PHn with selection signals for selecting the registers to be initialized, via the control links CTP, in correlation with the initialization data read in the memory NVM which it transmits through the bus ITB to the peripherals PH1-PHn.

It shall be noted that the peripherals PH1-PHn may be linked to the bus ADB through a specific bus linked to the bus ADB by an interface circuit BDG ensuring the communication between the two buses. The specific bus may be of AMBA (Advanced Microcontroller Bus Architecture) type such as the AHB (Advanced High-performance Bus) or APB (Advanced Peripheral Bus) developed by the company ARM.

Figure 3:
FIG. 3 represents the structure of a state register of the initialization circuit, FIG. 4 schematically represents an input interface of a peripheral of the microcontroller, according to one embodiment, FIGS. 5 and 6 schematically represent circuits of the input interface in FIG. 4, according to some embodiments.

The circuit FSM also includes configuration and state registers for each peripheral PH1-PHn of the microcontroller MC. FIG. 3 represents the structure of the configuration and state registers STRi corresponding to one of the peripherals PHi. Each register STRi includes a non-modifiable field NRG storing the number of registers to be initialized of the peripheral PHi, a field EN indicating whether or not the registers of the peripheral PHi should be initialized, and a field AI indicating whether or not the registers of the peripheral PHi have been initialized. The field AI is changed when all the registers of the peripheral PHi have been initialized. The circuit FSM also includes a register containing an address of the memory NVM from which the data for initializing the registers of the peripherals PH1-PHn is stored. The fields EN corresponding to all the peripherals PHi are for example initialized from the memory NVM upon activation of the microcontroller MC. The fields AI corresponding to all the peripherals PHi are initialized to a value indicating that the registers should be initialized. The circuit FSM initializes registers if at least one field EN of a peripheral indicates that a register initialization should be performed. When all the registers of a peripheral PHi have been initialized, the relevant field AI is updated.

Figure 4:
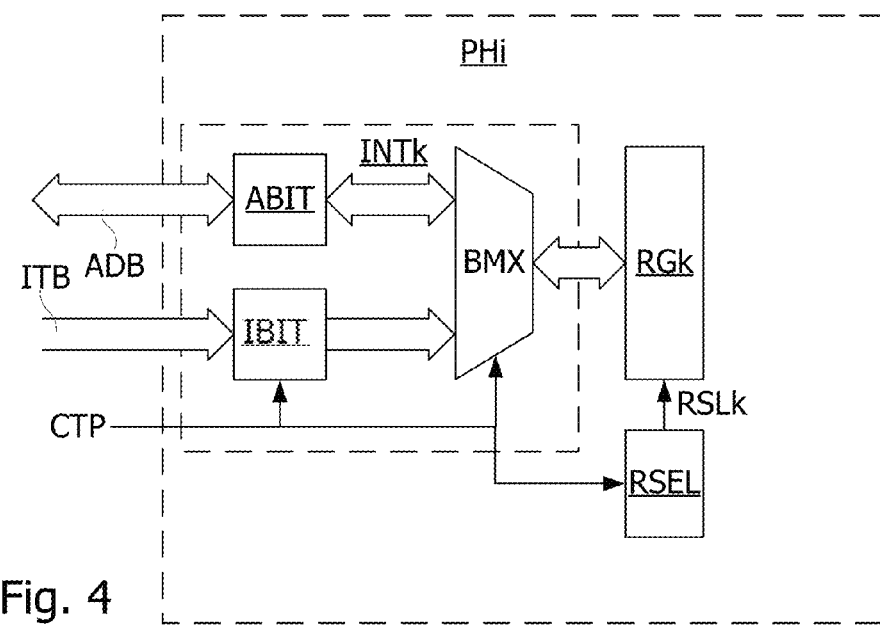

FIG. 4 represents input interface circuits of a peripheral PHi of the microcontroller. These circuits include an interface circuit INTk for each register RGk of the peripheral. Each circuit INTk includes a bus interface circuit ABIT connected to the bus ADB, a bus interface circuit IBIT connected at input to the bus ITB, a bus selecting circuit BMX connected to outputs of the interface circuits ABIT, IBIT and to the register RGk and a register selecting circuit RSEL. The circuits IBIT and ABIT are configured to perform a data format adjustment between the buses ABD and ITB and the register RGk. The circuit BMX is configured to select one or other of the buses ADB, ITB to be linked to the register RGk of the peripheral PHi according to the control signals CTP. Thus, during the initialization phase, the control signals CTP control the circuit BMX to supply an initialization datum sent by the bus ITB to the register RGk. Outside the initialization phase (when the signals CTP are inactive), the circuit BMX transfers data between the bus ADB and the register RGk. During the initialization phase, the circuit BMX can be configured to process, as a priority, the initialization of the register RGk in relation to access requests coming from the bus ADB. The circuit RSEL is configured to select the register(s) to be activated, particularly to receive an initialization datum during the initialization phase, according to the datum present on the bus ITB. Outside the initialization phase, the circuit RSEL activates the register indicated by the address sent by the bus ADB.

Figure 5:
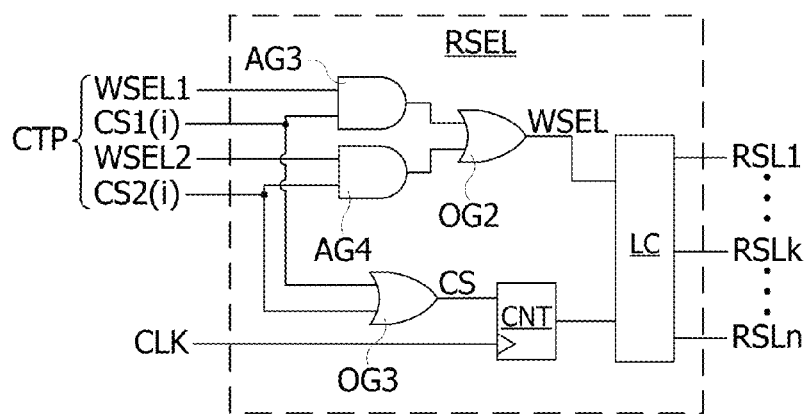

Referring to FIGS. 4 and 5, signals CTP include an activation signal CS(i) for each peripheral PHi, which is sent to the latter. If a data read in the memory NVM can simultaneously (e.g., concurrently) supply several register initialization words and if the bus ITP can simultaneously send all the words read, the signals CTP further include a word select signal WSEL that is sent to each peripheral PHi to indicate which word in the datum sent by the bus ITB should be transferred into a register of the selected peripheral. The signal WSEL includes a number of bits enabling the number of initialization words to be encoded for each datum sent by the bus ITB. The circuit IBIT is then configured to select a word sent by the bus ITB to be transferred into the register RGk to initialize it, according to the signals CTP.

The initialization procedure for initializing the registers of the peripherals can be speeded up by providing several signals CS(i) for each peripheral PHi, to simultaneously activate several peripherals PHi and simultaneously initialize registers of the activated peripherals PHi. In this case, a word select signal WSEL should be provided for each activation signal CS(i) sent to a same peripheral PHi to enable an initialization word to be selected in the datum present on the bus ITB for each activated peripheral PHi.

FIGS. 5 to 8 show the case of a memory NVM and of a bus ITB which can simultaneously send four words for initializing registers of peripherals, read in the memory NVM, and the case of control signals CTP including two activation signals CS1(i), CS2(i) for each peripheral PHi and thus two word select signals WSEL1, WSEL2 each including two bits to designate one word out of four. The output bus of the memory NVM and the bus ITP may thus include for example 128 data bits, while the output bus of the processing unit PU, the bus ABD and the registers of the peripherals PHi to be initialized have 32 data bits. By providing two pairs of signals (CS1, WSEL1), (CS2, WSEL2) it is possible to simultaneously activate two peripherals PHi, and to simultaneously initialize several registers in the two peripherals activated, if several register initialization words can be read at the same time in the memory NVM and sent by the bus ITB.

FIG. 5 represents a part of the register selecting circuit RSEL, according to one embodiment. The circuit RSEL includes two AND-type logic gates AG3, AG4, two OR-type logic gates OG2, OG3, a timer CNT and a logic circuit LC. The circuit RSEL receives at input the control signals CTP including in this example, a first selection signal CS1(i) for selecting the peripheral PHi and an associated word select signal WSEL1 for selecting a word in a datum sent by the bus ITB, and a second selection signal CS2(i) for selecting the peripheral PHi and an associated word select signal WSEL2 for selecting a word in a datum sent by the bus ITB. The gate AG3 receives at input the signals CS1(i) and WSEL1. Similarly, the gate AG4 receives at input the signals CS2(i) and WSEL2. The output of each gate AG3, AG4 is connected to a respective input of the gate OG2 that supplies the circuit LC at a given instant with a word select signal WSEL. The gate OG3 receives at input the signals CS1(i), CS2(i) and supplies at output on an initialization input of the timer CNT a signal CS indicating when the peripheral PHi is selected to be initialized. The timer CNT receives a clock signal CLK from the microcontroller MC, defining the rate at which the bus ITB sends register initialization data. The output of the timer CNT is connected to an input of the circuit LC. The timer is initialized to 0 by the signal CS when the peripheral is selected by one or other of the signals CS1(i), CS2(i) in order to be initialized. The circuit LC is connected at output to each of the register select inputs RGk of the peripheral PHi, and is configured to activate one or more registers RGk according to the signal WSEL and the value of the timer CNT when the peripheral PHi is selected to be initialized by one of the signals CS1(i), CS2(i).

When the timer CNT is equal to 1 upon the first cycle of initializing the registers of the peripheral PHi, the circuit LC is configured to simultaneously activate the registers having the numbers 0 to 3-WSEL, without exceeding the number of registers of the peripheral PHi minus one. Upon each of the following cycles of the initialization phase, when the value of the timer CNT is greater than 1, the circuit LC is configured to simultaneously activate four registers of the peripheral PHi, after those initialized in the previous cycle, without exceeding the number of registers of the peripheral PHi minus one. Therefore, during the n cycles following the first cycle, the circuit LC activates the registers having the numbers 4(n−1)-WSEL to 4n−1-WSEL.

Figures 6, 7:
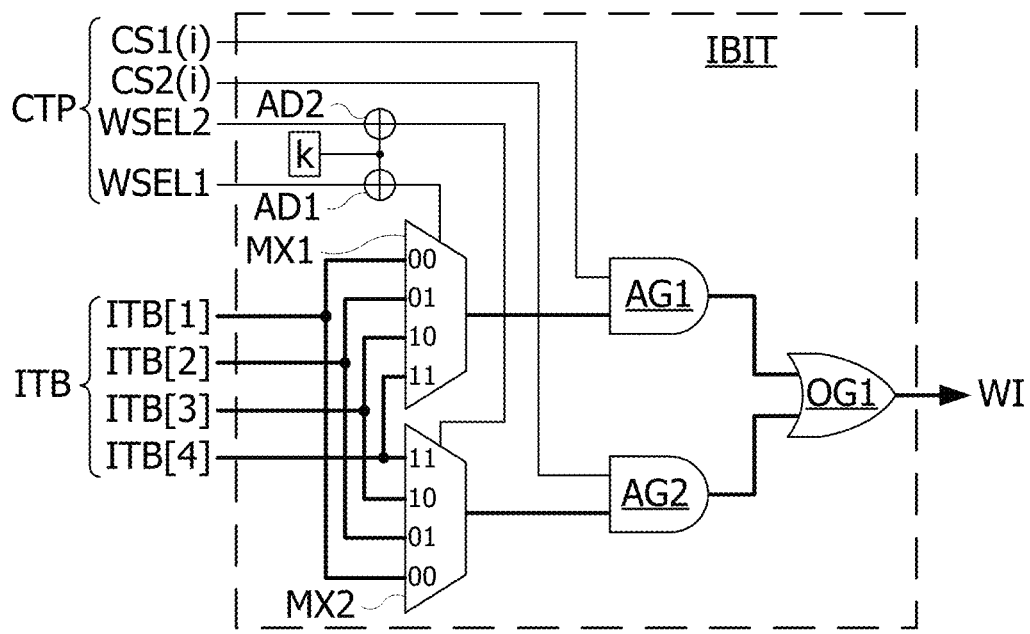
FIG. 7 represents an example of peripheral register initialization data stored in a non-volatile memory of the microcontroller.

FIG. 6 represents a part of the interface circuit IBIT of one of the registers RGk, according to one embodiment. The circuit IBIT includes two multiplexers MX1, MX2, two AND-type logic gates AG1, AG2, an OR-type logic gate OG1 and two adders AD1, AD2. Each multiplexer MX1, MX2 includes four inputs receiving the four register initialization words ITB[1], ITB[2], ITB[3], ITB[4] sent simultaneously by the bus ITB. Each of the adders AD1, AD2 supplies the control input of one of the multiplexers MX1, MX2 with one of the word select signals WSEL1, WSEL2, added to a register number k of the register RGk to which the circuit IBIT is connected. The output of the multiplexer MX1 is connected to an input of the gate AG1 another input of which receives the selection signal CS1(i) for selecting the peripheral PHi. Similarly, the output of the multiplexer MX2 is connected to an input of the gate AG2 another input of which receives the selection signal CS2(i) for selecting the peripheral PHi. The output of each gate AG1, AG2 is connected to a respective input of the gate OG1 that supplies at a given instant a word WI coming from the bus ITB to be written in the relevant register RGk of the peripheral PHi.

As a result of these arrangements, when one or other of the signals CS1(i) or CS2(i) is active for the peripheral PHi, the circuit IBIT of each register activated by the circuit LC, supplies at output WI one of the four words ITB[1], ITB[2], ITB[3], ITB[4] contained in the datum present on the bus ITB. The first word to be sent into the first register RG0 of the peripheral PHi is selected by the signal WSEL1, WSEL2 corresponding to the active signal CS1(i), CS2(i).

FIG. 7 represents an example of initialization data D1 to D4 stored in the memory NVM, in the event that the width of the bus ITB corresponds to the size of four words for initializing registers of peripherals PHi, and where the microcontroller MC includes four peripherals PH1, PH2, PH3, PH4. In the example in FIG. 7, the peripheral PH1 includes seven registers to be initialized (NRG(1)=7, EN(1)=1), the peripheral PH2 includes 6 registers which are not to be initialized (NRG(2)=6, EN(2)=0), the peripheral PH3 includes three registers to be initialized (NRG(3)=3, EN(3)=1), and the peripheral PH4 includes four registers to be initialized (NRG(4)=4, EN(4)=1). The datum D1 thus includes the register initialization words W1-W4 for initializing the first four registers of the peripheral PH1. The datum D2 includes the register initialization words W5-W7 for initializing the last three registers of the peripheral PH1 and the register initialization word W1 for initializing the first register of the peripheral PH3. The datum D3 includes the register initialization words W2-W3 for initializing the last two registers of the peripheral PH3, and the register initialization words W1-W2 for initializing the first two registers of the peripheral PH4. Finally, the datum D4 includes the register initialization words W3-W4 for initializing the last two registers of the peripheral PH4.

Figure 8:
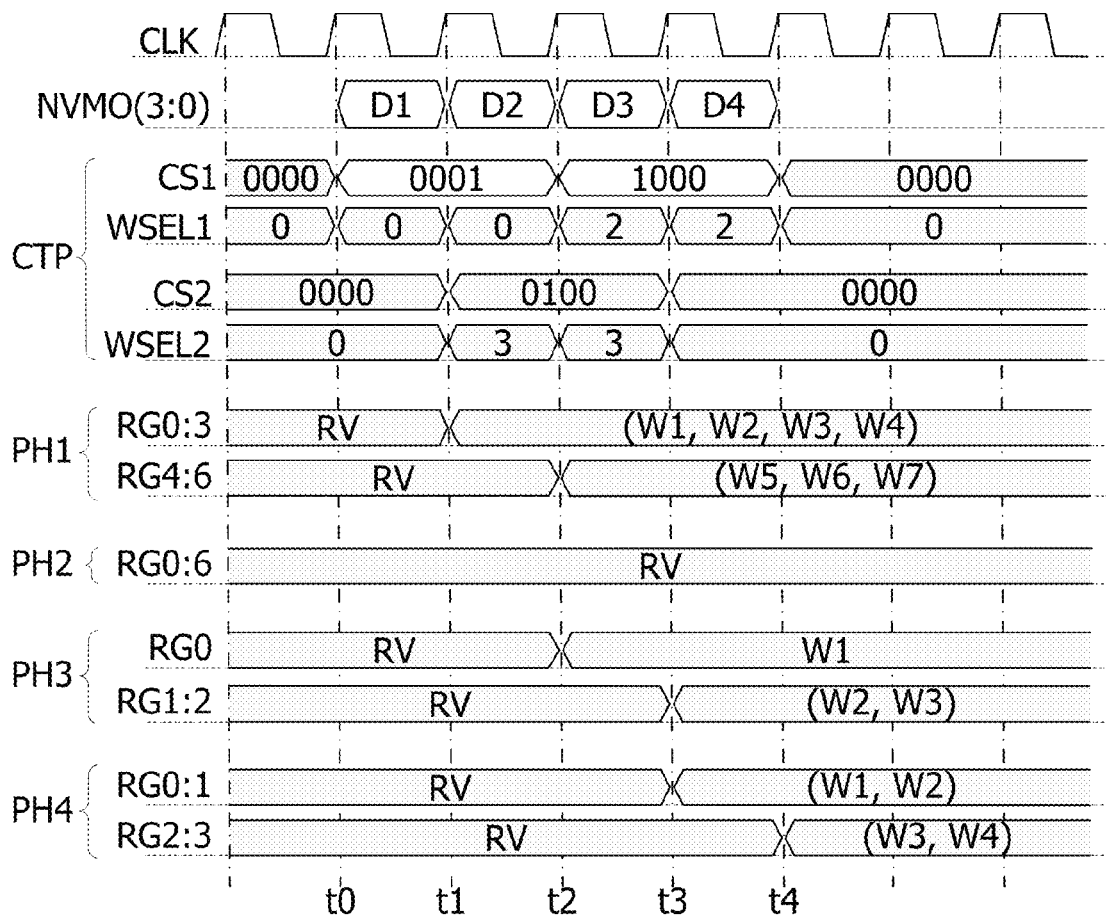
FIG. 8 represents timing diagrams of signals exchanged between a processing unit and peripherals of the microcontroller, during an initialization phase, according to one embodiment.

FIG. 8 represents timing diagrams of signals appearing during the initialization phase, between the circuit AINT, the memory NVM, and the peripherals PH1, PH2, PH3, PH4, in the example in FIG. 6. The timing diagrams in FIG. 8 include the clock signal CLK of the microcontroller MC, the output signals of the memory NVM, the signals CS1, CS2, WSEL1, WSEL2, and the content of the registers of the peripherals PH1-PH4. Before an instant t0, the signals CS1, CS2, WSEL1, WSEL2 are all on 0 and the registers of the peripherals PH1-PH4 are at any initial values RV. At the instant t0, the datum D1 is read in the memory NVM, and the signals CS1 are set to the value 0001 to activate the peripheral PH1. During the next clock cycle up to an instant t1, the signal WSEL1 remains on 0. The circuit LC thus activates the registers RG0 to RG3 of the peripheral PH1, and the words W1-W4 of the datum D1 are transferred simultaneously into the activated registers. At the instant t1, the datum D2 is read in the memory NVM, the signals CS1 remain on the value 0001 to keep the peripheral PH1 activated, and the signal WSEL1 remains on 0. The signals CS2 are set to 0100 to activate the peripheral PH3, and the signal WSEL2 is set to 3 to select the fourth word W1 of the datum D2. During the next clock cycle up to an instant t2, the circuit LC of the peripheral PH1 activates the registers RG4 to RG6. The first three words W5, W6, W7 of the datum D2 are thus transferred simultaneously into the registers RG4 to RG6 of the peripheral PH1. In parallel, the circuit LC of the peripheral PH3 activates the register RG0 (3-WSEL2=0). The fourth word W1 of the datum D2 selected by the signal WSEL2 is thus transferred into the first register RG0 of the peripheral PH3. At the instant t2, the datum D3 is read in the memory NVM, the signals CS1 are set to 1000 to activate the peripheral PH4, and the signal WSEL1 is set to 2 to read the datum D3 starting from the third word. The signals CS2 remain on 0100 to keep the peripheral PH3 activated and the signal WSEL2 remains on 3. During the next clock cycle up to an instant t3, the circuit LC of the peripheral PH4 selects the registers RG0, RG1 (0 and 3-WSEL1). The last two words W1, W2 of the datum D3 are thus transferred simultaneously into the registers RG0 and RG1 of the peripheral PH4. In parallel, the circuit LC of the peripheral PH3 selects the registers RG1, RG2 (4(n-1)-WSEL2=1 and 4n-1-WSEL2=4 limited to 2 because the peripheral PH3 only includes three registers). The first two words W2, W3 of the datum D3 are thus transferred simultaneously into the registers RG1 and RG2 of the peripheral PH3. At the instant t3, the datum D4 is read in the memory NVM, the signals CS1 remain on 1000 to keep the peripheral PH4 activated, the signal WSEL1 remains on 2 to read the datum D4 starting from the first word W3 for initializing the third and fourth registers RG2, RG3 of the peripheral PH4 (4(n-1)-WSEL1=2 and 4n-1-WSEL1=5 limited to 3 because the peripheral PH3 only includes four registers). The signals CS2 are put to 0000 and the signal WSEL2 is put to 0 because there are no more peripherals to be initialized. During the next clock cycle up to an instant t4, the circuit LC of the peripheral PH4 selects the registers RG2, RG3. The first two words W3, W4 of the datum D4 are thus transferred simultaneously into the registers RG2 and RG3 of the peripheral PH4. At the instant t4, the signals CS1 are put to 0000 and the signal WSEL1 is put to 0 because there are no more peripherals to be initialized. Thus, at the instant t4, all the registers of the peripherals PH1, PH3, PH4 have been initialized with words read in the memory NVM. As the peripheral PH2 is not to be initialized (EN(2)=0), its six registers keep their initial value.

The timing diagrams in FIG. 8 show that four registers can be initialized during one clock signal cycle, whether these four registers all belong to a single peripheral or are split between two peripherals. If a single register could be initialized upon each read of the memory NVM (number of initialization words per datum read in the memory NVM equal to 1), one clock cycle would be taken to initialize each of the registers of the peripherals. As a comparison, the initialization of such registers by a sequence of instructions executed by the processing unit PU would take approximately 5 cycles for each register to be initialized. In addition, the sequence of instructions uses the resources of the program memory and its execution uses the resources of the processing unit PU. On the other hand, the implementation of the circuit AINT enables the registers of the peripherals to be initialized without using the resources of the processing unit PU or of the program memory.

It will be understood by those skilled in the art that various alternative embodiments and various applications of the present invention are possible. In particular, the present invention is not limited to the examples of embodiments described herein and also, for example, covers an initialization circuit distinct from the processing unit of the microcontroller, capable of executing a sequence of instructions to initialize the registers of the peripherals of the microcontroller, through the initialization bus ITB.

It is not necessary for the accesses to the memory NVM, requested by the processing unit PU, to have priority over those requested by the initialization circuit AINT. Indeed, failing to comply with this priority rule merely delays the instant at which the processing unit PU starts up. Furthermore, if this priority rule is not met, it is not necessary to give priority to the initialization bus AINT on the main bus ADB to access the registers of the peripherals PHi. Indeed, if the processing unit PU has not started, no request to access the peripherals PHi is sent by the main bus ADB.

Also, the number of register initialization words sent by the bus ITP may be chosen different to four, or the number of peripherals liable to be activated simultaneously can be chosen higher than two. In this case, the control signals include as many signals CS and WSEL as peripherals to be activated simultaneously.

Furthermore, the non-volatile memory NVM in which the words for initializing the registers of the peripherals are contained, may be internal or external to the microcontroller MC.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to initialize registers associated with peripherals of a microcontroller, comprising:
   accessing initialization data in a non-volatile memory coupled by a main bus to a processing unit of the microcontroller and to the peripherals, the accessing directed by at least one data structure associated with an initialization circuit distinct from the processing unit, the data structure representing a location of the initialization data in the non-volatile memory and an amount of initialization data to transfer;
   activating a peripheral having registers to be initialized; and
   transferring the accessed initialization data into the registers of the activated peripheral, the accessed initialization data transferred to the peripherals over an initialization bus distinct from the main bus.

2. A method according to claim 1, comprising:
   prioritizing access to the non-volatile memory over the main bus higher than access to the non-volatile memory over the initialization bus; and
   prioritizing access to the registers of peripherals over the initialization bus higher than access to the registers of the peripherals requested over the main bus.

3. A method according to claim 1, comprising:
   selecting several registers of the activated peripheral;
   sending several register initialization words to initialize respective ones of the several registers of the activated peripheral concurrently over the initialization bus; and
   loading the several register initialization words sent into the respective ones of the selected several registers of the activated peripheral.

4. A method according to claim 1, comprising:
   activating several peripherals concurrently to each receive at least one register initialization word.

5. A method according to claim 1, comprising:
   sending concurrently over the initialization bus several register initialization words to initialize several registers of the activated peripheral; and
   loading the several register initialization words into selected registers of the activated peripheral in one cycle of a clock signal of the microcontroller.

6. A method according to claim 1, comprising:
   transferring, by the initialization circuit, requests to access the non-volatile memory sent over the main bus; and
   transferring, by the initialization circuit, data read in the non-volatile memory over the main bus in response to the requests to access.

7. A microcontroller, comprising:
   a processing unit;
   a non-volatile memory configured to store initialization data;
   a plurality of peripherals having registers to be initialized;
   an initialization circuit configured to initialize the registers of the plurality of peripherals with the initialization data, wherein the initialization circuit includes circuits configured to store a storage base address in the non-volatile memory, and, for each peripheral of the plurality of peripherals, a number of registers to be initialized and indicators configured to indicate whether or not the respective peripheral should be initialized and whether or not the respective peripheral has been initialized;
   a main bus linking the processing unit to the peripherals and to the non-volatile memory, wherein the initialization circuit links the main bus to the non-volatile memory; and
   an initialization bus, distinct from the main bus, linking the initialization circuit to the peripherals.

8. A microcontroller according to claim 7 wherein the initialization bus has a width corresponding to several register initialization words configured to initialize a register of a peripheral.

9. A microcontroller according to claim 7, comprising:
   an activation link configured to link the initialization circuit to each peripheral of the plurality of peripherals to activate each respective peripheral to initialize the registers of the activated peripheral; and
   a data link configured to send a selection signal to select a peripheral register initialization word in a datum sent over the initialization bus.

10. A microcontroller according to claim 7, comprising:
    several activation links configured to link the initialization circuit to each peripheral of the plurality of peripherals to activate each respective peripheral to initialize the registers of the respective activated peripheral; and
    a data link associated with each activation link of the several activation links, each data link configured to send a selection signal to select peripheral register initialization word in a datum sent over the initialization bus.

11. A microcontroller according to claim 7 wherein each peripheral of the plurality of peripherals includes an interface circuit configured to select a register and a register initialization word in a datum sent over the initialization bus and configured to load the selected register initialization word into the selected register.

12. A microcontroller according to claim 7 wherein each peripheral of the plurality of peripherals includes an interface circuit coupled to the main bus and to the initialization bus, each interface circuit configured to give higher priority to access requests received over the initialization bus than access requests received over the main bus.

13. A device, comprising:
    a processing unit;
    a memory interface coupleable to a memory configured to store initialization data;
    at least one peripheral having at least one register to be initialized;
    an initialization circuit coupled to the memory interface and the at least one peripheral, the initialization circuit configured to initialize the at least one register of the at least one peripheral with the initialization data based on at least one data structure associated with the initialization circuit, the data structure including an address associated with a location of the initialization data in the non-volatile memory, an amount of initialization data to transfer, and a status of initialization data transferred;
    a first bus coupling the processing unit, the at least one peripheral, and the initialization circuit; and
    a second bus, distinct from the first bus, the second bus coupling the initialization circuit to the peripherals, wherein access to the memory interface by the processing unit and the at least one peripheral is enabled via the initialization circuit.

14. A device according to claim 13 wherein the memory is a volatile memory.

15. A device according to claim 13, comprising:
    a memory coupled to the memory interface.

16. A device according to claim 13 wherein a first memory access request received at the memory interface over the first bus has a configurable priority relative to a second memory access request received at the memory interface over the second bus.

17. A device according to claim 13 wherein the at least one peripheral has a plurality of registers to be initialized, each register of the plurality configured to be initialized with initialization data passed over the second bus in one cycle of a clock signal passed to the peripheral.

18. A device according to claim 13 wherein the device is a microcontroller.

19. A device according to claim 13 wherein the second bus has a width corresponding to several registers of a respective one of the plurality of peripherals.

* * * * *